Oct. 26, 1948.　　　　K. J. KNUDSEN　　　　2,452,244

ELECTRICAL RATIO METER CIRCUIT

Filed March 31, 1944

INVENTOR
KNUD J. KNUDSEN
BY
ATTORNEY

Patented Oct. 26, 1948

2,452,244

UNITED STATES PATENT OFFICE 2,452,244

ELECTRICAL RATIO METER CIRCUIT

Knud J. Knudsen, Waterbury, Conn., assignor to The Lewis Engineering Company, Naugatuck, Conn., a corporation of Connecticut Application March 31, 1944, Serial No. 528,839

18 Claims. (Cl. 177—351)

This invenntion relates to an electrically operated indicator and more particularly to an electrically operated indicator including a meter of the direct current type which is caused to be responsive to changes in an electrical quantity, e. g. resistance, of a device conducting an alternating current.

In prior electrically operated indicators, alternating current and direct current meters have been arranged to respond to variations in an electrical quantity of a control device forming a part of the indicator. The variable electrical quantity is generally resistance and the variations may result from and be proportional to changes in temperature, pressure, light, or other condition desired to be controlled from or quantitatively indicated at a remote point. Heretofore alternating current meters have been used in conjunction with control devices such as potentiometers which conduct alternating current during operation, and direct current meters have been used in similar arrangements with potentiometers which conduct direct current during operation.

Electrically operated indicators using alternating current meters have not been satisfactory for many purposes because alternating current meters are subject to errors resulting from variations in supply frequency and require auxiliary damping means. On the other hand, direct current meters of the ratio type possess neither of these disadvantages and are ideally suited for various indicator applications.

As to control elements suitable for use in electrically operated indicators, the fluid potentiometer, which because of the phenomenon of electrolysis can be used only with alternating current, has many advantages over the usual wire wound rheostat which is useable with direct current. For example, errors due to friction between contact arms and wire coils and those caused by uneven wear of the wire are avoided by using fluid potentiometers. Furthermore, a fluid potentiometer is inherently self-damping thereby preventing errors caused by random oscillations of the contact arm of the usual wire wound rheostat. Trouble has also been experienced in the use of wire wound potentiometers for aircraft service due to changes in the viscosity of the lubricant used to reduce friction of the moving parts.

In accordance with this invention, an electrically operated indicator is provided which includes a novel electric circuit making it possible to use a meter of the direct current type in combination with a fluid potentiometer conducting alternating current only. Thus the advantages of the direct current meter and of the fluid potentiometer are combined to form an improved indicator.

An object of this invention is to provide an improved electrically operated indicator.

Another object is to provide in an A. C. energized instrument a D. C. ratio meter, control member, and circuit means and components which supply the deflecting coil of the meter with A. C. having a D. C. component controlled by the member, and which supply the restoring coil with D. C. proportional to the said D. C. component during fluctuations of the A. C. supply; and to provide in combination with the foregoing a fluid potentiometer of sensitive reaction, operable by the said member, the potentiometer carrying pure A. C. devoid of any D. C. components.

A further object is to provide an indicator including a direct current type of meter arranged to be responsive to adjustments of a fluid type potentiometer.

A still further object is to provide an indicator including rectifier elements for permitting a direct current type of meter to be responsive to changes in the resistance of a fluid type potentiometer conducting alternating current.

Other objects and advantages will become apparent from the following specification wherein reference is made to the drawings, in which.

Figure 1:
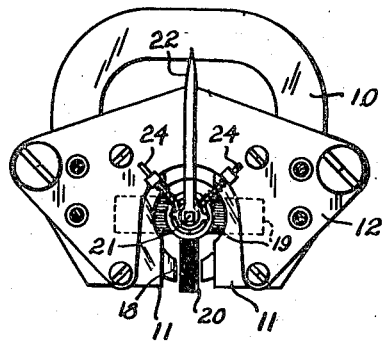
Fig. 1 is a plan view with the scale removed of a ratio meter useable with this invention.
Figure 2:
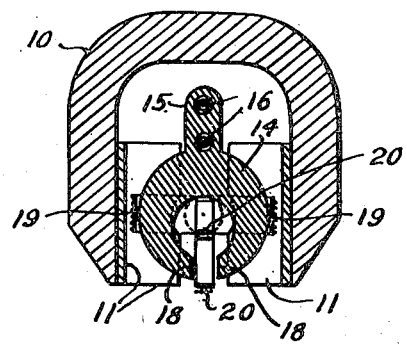
Fig. 2 is a horizontal section taken through the coils and permanent magnets of the meter of Fig. 1.

Referring first to Figs. 1 and 2, a suitable meter for use in the indicator of this invention comprises a permanent magnet 10 of horseshoe shape for which generally channel-shaped iron pole pieces 11 are provided. The pole pieces 11 are fixedly secured to a non-magnetic top plate 12. Suitably fastened to the top plate 12 is a soft iron core 14 of eccentric generally annular shape having an integral extension 15 through which bolts 16 are passed to secure the core to the top plate, the bolts 16 preferably are non-magnetic. The core 14 has an air gap defined by spaced termini 18.

A moving coil assembly for the meter comprises a deflecting coil 19 and a restoring coil 20. The coils 19 and 20 lie between substantially the same spaced parallel planes, have their axes horizontal and arranged at right angles to each other, and are secured to and lie at right angles with respect to a suitably rotatably supported shaft means 21 carrying a pointer 22. An indicating scale for the pointer (not shown), is provided in the usual manner. A pair of counter-poise arms 24 are provided to balance the coil assembly and other parts of the meter which turn therewith. A meter of the type shown in Fig. 1 and Fig. 2 is more completely described and claimed in my copending application Serial No. 458,481, filed September 15, 1942, now matured into U. S. Patent No. 2,391,168, dated December 18, 1945; but since meters of this general character are well known, more detailed description is not given here.

Figure 3:
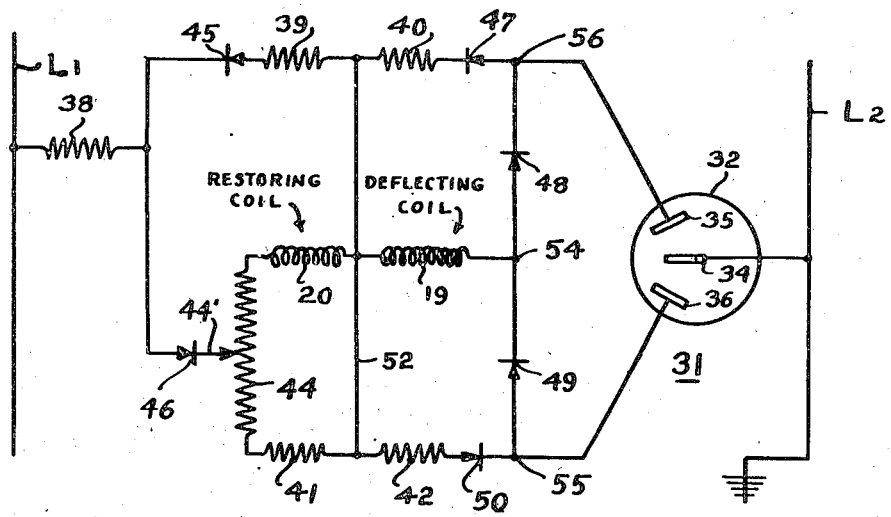
Fig. 3 is a schematic wiring diagram of the indicator in accordance with this invention.

Referring now to Fig. 3, a fluid potentiometer 31 of well known construction is diagrammatically illustrated as comprising a suitable container 32 for a conducting fluid of relatively high resistance. The fluid preferably has a low temperature coefficient of resistance so that when used in the manner to be described with the ratio meter of Figs. 1 and 2, errors resulting from ambient temperature changes are negligible. Means such as hermetically closed bellows (not shown) may be provided in conjunction with the container 32 to accommodate changes in the volume of the fluid resulting from changes in temperature and atmospheric pressure or both.

The potentiometer 31 has a movable vane 34 interposed between spaced stationary terminals 35 and 36. Suitable means responsive to changes in pressure, temperature, light, or other condition may be provided in a well known manner to move the vane 34 toward and away from the terminals 35 and 36. Movement of the vane 34 toward the terminal 35 reduces the resistance between the vane 34 and the terminal 35. Likewise, movement of the vane 34 toward the terminal 36 decreases the resistance between the vane 34 and the terminal 36 and increases the resistance between the vane 34 and the terminal 35. The action of the fluid potentiometer 31 is therefore fundamentally the same as that of a wire wound potentiometer having an intermediate sliding contact, but possesses the numerous advantages hereinbefore mentioned. The well known Hartz potentiometer is exemplary of one type of fluid potentiometer that has been used and found satisfactory.

Alternating current of suitable frequency is supplied to the indicator from a source (not shown) through the usual conductors $L_1$ and $L_2$, the conductor $L_2$ being grounded as indicated. In addition to the potentiometer 31, the indicator comprises the deflecting coil 19 and the restoring coil 20 of the meter of Figs. 1 and 2, a current limiting resistor 38, a plurality of balancing resistors 39, 40, 41 and 42, a slide wire potentiometer 44, and a plurality of half-wave rectifiers consecutively numbered 45 to 50. The potentiometer 44 includes an adjustable arm 44' and is used to adjust the full scale reading of the meter by varying the current flowing in the restoring coil 20.

For installations wherein large variations of ambient temperature are to be expected, such as on aircraft, the various resistors should be formed of material having a low temperature coefficient of resistance, preferably zero, and the rectifiers should also be selected for their uniformity of operating characteristics over a wide temperature range. Rectifiers of the selenium cell type have been found ideally suited for this type of service.

The ohmic resistance of each of the resistors 40 and 42 is preferably the same as the ohmic resistance of the deflecting coil 19, and the resistance of the resistor 39 is preferably substantially equal to the resistance of the parallel circuit including the potentiometer resistance 44, the resistor 41, and the resistance of the restoring coil 20. Thus the resistance of the circuit comprising the rectifier 46, the parallel paths comprising the potentiometer 44, restoring coil 20 and resistor 41, and comprising the resistor 42, rectifier 50, and fluid path between the terminal 36 and vane 34 of the fluid potentiometer is the equivalent of the resistance of the circuit comprising the rectifier 45, resistor 39, deflecting coil 19, rectifier 49 and fluid path between the terminal 35 and vane 34 of the potentiometer. As a result, the amplitude of the positive half-waves passing through the fluid path between the terminal 36 and vane 34 is equal to the amplitude of the negative half-waves passing therebetween, and consequently the current through the said fluid path is pure alternating current devoid of any D. C. component.

In order that changes in the resistance of the current path in the fluid between the vane 34 and the terminals 35 and 36 due to changes in ambient temperature shall not greatly affect the ratio of the currents flowing in the coils 19 and 20, the resistance of the fluid path between the terminals is preferably very much greater than the total of all other resistances in the circuit.

Of the alternating current wave supplied to the indicator by the conductors $L_1$ and $L_2$, the positive half-waves or loops may be assumed to flow through the resistor 38, the rectifier 46, the arm 44', and the parallel circuit including the resistors 41 and 44 and the restoring coil 20 to a cross conductor 52. From the cross conductor 52, a portion of the positive half-waves flows through the deflecting coil 19 to a branch point 54 at one terminal of the rectifier 49, and the remaining portion flows through the resistor 42 and the rectifier 50 to a branch point 55 at the other terminal of the rectifier 49. Since the portion of the positive half waves which flows through the deflecting coil 19 must flow to the conductor $L_2$ through the rectifier 49 and the fluid between the terminal 35 and the vane 34, the strength of the said portion, representing positive current in the deflecting coil 19, is inversely proportional to the resistance of the fluid path between the terminal 35 and the vane 34.

Considering the remaining portion of the positive half wave of current which flows through the path including the rectifier 50 to the point 55, due to the resistance of the rectifier 50, the voltage drop will be greater through the resistor 42 and rectifier 50 than it will be across the coil 19, and therefore no positive current flows through the rectifier 49 irrespective of its forward resistance, and all of the said remaining positive current flows to the conductor $L_2$ through the fluid path between the terminal 36 and the vane 34.

The negative half-waves or loops of the alternating current wave supplied to the indicator by the conductors $L_1$ and $L_2$ flow through the resistor 38, the rectifier 45, and the resistor 39 from the cross conductor 52. Because of the rectifier 46, obviously no negative half-waves can flow from the cross conductor 52 through either the resistor 41 or the restoring coil 20, and this is of considerable importance in the proper functioning of the meter. Thus it is seen that the restoring coil of the meter is subjected solely to an intermittent direct current, comprising portions of the positive half-waves of the alternating current supplied to the indicator. Continuing to trace the negative half-waves to the cross conductor 52 a portion of the negative half-waves flows through the coil 19 from the branch point 54 and the remaining portion flows through the resistor 40 and the rectifier 47 from the branch point 56. Since the negative half-waves of the current through the deflecting coil 19 must flow from the conductor L2 through the rectifier 49 and the fluid path between the terminal 36 and the vane 34, the strength of the said negative half-waves, representing negative current in the deflecting coil 19, is inversely proportional to the resistance of the fluid path between the terminal 36 and the vane 34. As a result, if the vane 34 is closer to the terminal 36 than to the terminal 35, the positive and negative half-waves of the alternating current in the deflecting coil 19 will have different amplitudes, (the negative half-waves being greater) and consequently the coil will exert a torque in one direction. Conversely, if the vane 34 is closer to the terminal 35 than to the terminal 36, the positive half-waves in the coil 19 will be greater in amplitude than the negative, and the coil will exert a torque in the opposite direction. Likewise, as previously explained, the negative current reaching the point 56, flows to the conductor L2 through the fluid path between the terminal 35 and the vane 34.

Assuming that the several rectifiers have substantially identical impedances and operating characteristics, there is no direct current component present in the A. C. flowing in the potentiometer 31 so long as the resistance of each of the resistors 40 and 42 is equal to the resistance of the deflecting coil 19 and so long as the resistance of the parallel circuit including the resistors 41 and 44 and the restoring coil 20 is substantially equal to the resistance of the resistor 39.

It will be noted that the rectifiers 47, 48, 49 and 50 as shown in Fig. 3 are serially connected in a closed loop which also includes the resistors 40, 42 and the conductor 52. The polarity of each of the rectifiers is such as to oppose clockwise flow of current in the loop thus defined.

Since, as stated, the resistance of the fluid potentiometer 31 is high with respect to the combined resistances of all the other components of the circuit, whatever direct current component will be caused to flow in the potentiometer 31 due to slight unbalance between the resistor 39 and the parallel circuit including the potentiometer 44, resistor 41 and coil 20, will be extremely small and of no practical significance.

It is thus seen that the relative magnitudes of the positive and negative currents in the coil 19 depends upon the adjusted position of the vane 34, whereas the potentiometer 31, regardless of the position of the vane, is always conducting a symmetrical or balanced alternating current, i. e. an alternating current having no direct current component. It is also to be noted that the rectifiers function not only to prevent current flow in a reverse direction therethrough, but also function to control the division of current between the various branches of the parallel circuits shown. In other words, regardless of the position of the vane 34, the positive and negative half-waves of the currents reaching the point 55 are equal to each other in amplitude. Likewise, the positive and negative half-waves of the current reaching the point 56 are equal to each other in amplitude.

From the foregoing description of the action of the potentiometer 31, it can readily be seen that movement of the vane 34 toward the terminal 35 causing a decrease in the resistance therebetween and a corresponding increase in the resistance between the vane 34 and the terminal 36 results in a decrease in the amplitude of the negative half-waves or loops and an increase in the amplitude of the positive half-waves or loops in the coil 19. This change in current flowing in the coil 19 causes a deflection of the pointer 22 by an amount related to the degree of movement of the vane 34. Likewise a movement of the vane 34 toward the terminal 36 causes an opposite movement of the pointer 22.

From the foregoing it will be clear that the deflecting coil 19 and rectifier 48 may be considered as being in series with the potentiometer arm comprising the fluid path between the potentiometer terminal 35 and vane 34; also, that the deflecting coil 19 and rectifier 49 may be considered as in series with the potentiometer arm comprising the fluid path between the terminal 36 and vane 34. The resistor 40 and rectifier 47 function as a by-pass circuit around the deflecting coil 19 and rectifier 48; likewise, the resistor 42 and rectifier 50 function as a by-pass circuit around the deflecting coil 19 and rectifier 49. Each of these by-pass circuits operates in such a manner that they are alternately current-free when the instrument is being energized with alternating current on the line wires L1 and L2. Thus, each by-pass circuit during the interval that it is not carrying current forces the deflecting coil 19 and the other by-pass circuit to carry the current which is handled through the two arms or paths of the potentiometer 31.

By virtue of the rectifiers 47, 48, 49 and 50 being all of substantially the same impedance, as above stated, the impedance of each of the above by-pass circuits is substantially equal to the combined impedance of the coil 19 and one of the rectifiers 48, 49.

Because of the organization of the network and circuit components associated with the ratio meter, as shown in Fig. 3, adjustment of the slider 44' of the potentiometer 44 for the purpose of changing the current in the restoring coil 20 so as to calibrate the meter will not alter the current flowing through the deflecting coil 19. Changes in the setting of the potentiometer 31, resulting in changes in the current passing through the deflecting coil 19, alter the magnitude of the intermittent direct current passing through the restoring coil 20; however, this condition is automatically taken into account when calibrating the instrument, so that no inaccuracy in the readings results.

Furthermore, the circuit shown in Fig. 3 is so organized that the magnitude of the intermittent direct current which energizes the restoring coil 20 will have a constant relationship to the magnitude of the D. C. component in the deflecting coil 19 regardless of variations in the voltage of the alternating current applied to the line wires L1 and L2. As a result, normal variations in the line voltage will not affect the accuracy of the readings of the instrument.

In the appended claims, where the terms "impedance and "impedance device" are used, it is intended that they shall denote an electrical device which impedes the flow of current, whether alternating or direct, so that a voltage drop exists across the terminals of said device. Such devices include the resistance elements 38, 39, 40, 41, 42 and 44, which may or may not have inductance, as is well known in the art, and include the potentiometer 31 whose fluid path between the terminals 35 and 36 may have inductive and/or capacitive reactance.

I claim:

1. An indicator comprising a meter having a restoring coil and a deflecting coil, means for energizing the restoring coil with a direct current, an adjustable potentiometer having an intermediate connection, electrical connections between said deflecting coil and said potentiometer, means for supplying alternating current to said potentiometer and said deflecting coil, and means interposed in said connections for causing the relative magnitude of the successive half-waves of current in said deflecting coil to depend upon the adjusted position of said potentiometer and circuit means connected in shunt relation to said deflecting coil for maintaining the successive half-waves of the alternating current in said potentiometer equal to each other independent of the adjusted position of said potentiometer.

2. In an indicator arranged to be energized from a source of alternating current and including a meter having a deflecting coil, a potentiometer, a plurality of rectifiers connected in a closed loop at the same polarity with respect to said loop, a first pair of terminals on said loop dividing said rectifiers into two groups, a second pair of terminals on said loop between rectifiers in said groups, respectively, and means connecting said deflecting coil to said first pair of said terminals and said potentiometer to said second pair of terminals.

3. In an indicator arranged to be energized from a source of alternating current and comprising a potentiometer and a meter having a pair of coils, means for energizing the first of said coils with direct current, a plurality of rectifiers connected in a closed loop at the same polarity with respect to said loop, a pair of terminals on said loop dividing said rectifiers into two groups, means connecting the second of said coils across said terminals, and means connecting the terminals of said potentiometer to said loop between rectifiers in said groups, respectively.

4. An indicator arranged for energization from a source of alternating current and including an adjustable impedance means having a pair of impedance arms variable inversely with respect to each other, a meter having a coil, a first half-wave rectifier, means connecting said coil, said first rectifier, and one of said arms in a series circuit with each other for constraining current flow through said series circuit to a positive half-wave of an alternating current, a second half-wave rectifier, means connecting said coil, said second rectifier, and the other of said arms in a second series circuit with each other for constraining current flow through said second series circuit to a negative half-wave of an alternating current, and means by-passing said coil for supplying a negative half-wave of an alternating current to said one arm and a positive half-wave of an alternating current to said other arm.

5. In an electrical indicator arranged for energization from a source of alternating current, the combination with a potentiometer, a meter having a coil, electrical connections between said potentiometer and said coil, and rectifier means inserted in said connections for causing the relative value of successive half-waves of alternating current through said coil to be indicative of the adjusted position of said potentiometer, of means connected in shunt relation to said coil and in series with said potentiometer for causing the successive half-waves of alternating current through said potentiometer to be equal in magnitude.

6. An instrument to be energized by alternating current, comprising a ratio meter having a deflecting coil and a restoring coil; a fluid potentiometer; terminals for connection to a source of alternating current; means connected with the potentiometer, the said terminals, and the deflecting coil for energizing the latter with an alternating current having a D. C. component the magnitude of which is controlled by the setting of the potentiometer, including means for energizing the restoring coil with a direct current which is proportional to the magnitude of the D. C. component in the deflecting coil, irrespective of variations in the voltage of the A. C. source.

7. An instrument to be energized by alternating current, comprising a ratio meter of the permanent magnet type, having a deflecting coil and a restoring coil; a fluid potentiometer; terminals for connection to a source of alternating current; means connected with the potentiometer, the said terminals and the deflecting coil for energizing the latter with a current having a D. C. component the magnitude of which is controlled by the setting of the potentiometer, including means for energizing the restoring coil with a direct current comprising a component of the A. C. passing through the said terminals; and means for adjusting the current in the restoring coil while maintaining the current in the deflecting coil substantially unchanged.

8. In an alternating current electrical instrument, a meter having a pair of coils; terminals for connection to a source of alternating current; an adjustable impedance device; and means including a circuit connected with the said terminals, meter coils and impedance device, providing in one of the coils a direct current obtained from the alternating current passing through the said terminals, and providing in the other coil an alternating current having positive and negative half-waves of different amplitude, the difference in amplitude being controlled by the setting of the said impedance device.

9. In an alternating current electrical instrument, a meter having a pair of coils; terminals for connection to a source of alternating current; an adjustable impedance device; and means including a circuit connected with the said terminals, meter coils and impedance device, providing in one of the coils a direct current obtained from the alternating current passing through the said terminals, and providing in the other coil an alternating current having positive and negative half-waves of different amplitudes, the difference in amplitudes being controlled by the setting of the said impedance device, and the said means including means maintaining pure alternating current devoid of any D. C. components in the impedance device.

10. In an indicator arranged to be energized from a source of alternating current and including a meter having a restoring coil and a deflecting coil connected in series, a plurality of rectifiers serially connected in a closed loop, the polarity of each rectifier being such that all the rectifiers oppose flow of current in the loop in the same direction; a first pair of terminals on said loop dividing said rectifiers into two groups; a second pair of terminals on said loop between rectifiers in said groups, respectively; means connecting said deflecting coil to one of said pairs of terminals; impedance means for connecting the other pair of terminals to one side of the source of alternating current; circuit means, including a rectifier series-connected to the restoring coil, connecting the latter to the other side of the source of alternating current; and a circuit, including a rectifier, shunted across the restoring coil and its series-connected rectifier.

11. An instrument to be energized by alternating current, comprising a meter having a deflecting coil; a fluid potentiometer of relatively high impedance; terminals for connection to a source of alternating current; resistors of relatively low impedance; and means connected with the resistors, the potentiometer, the said terminals, and the deflecting coil for energizing the latter with an alternating current having a D. C. component the magnitude of which is controlled by the setting of the potentiometer, including means for maintaining pure alternating current devoid of any D. C. components in the potentiometer, the relative impedances of the potentiometer and resistors minimizing the effects of changes in ambient temperature on the instrument.

12. An instrument to be energized by alternating current, comprising a meter having a deflecting coil; a fluid potentiometer having a plurality of arms; terminals for connection to a source of alternating current; and means connected with the potentiometer, the said terminals, and the deflecting coil for energizing the latter with an alternating current having a D. C. component the magnitude of which is controlled by the setting of the potentiometer, the said means maintaining pure alternating currents of different amplitudes and devoid of any D. C. components in the respective arms of the potentiometer regardless of the setting of the latter.

13. An instrument to be energized by alternating current, comprising a meter having a deflecting coil and restoring coil; a member movable in response to changes in a condition; terminals for connection to a source of alternating current; means controlled by the said member and connected with the terminals and the deflecting coil for energizing the latter with an alternating current having a D. C. component the magnitude of which is controlled by the setting of the said member, the said means including parallel circuits terminating at one of the terminals; and rectifiers in said parallel circuits, the said restoring coil being interposed in one of the parallel circuits for D. C. energization.

14. An instrument to be energized by alternating current comprising a meter having a deflecting coil; an impedance device having a pair of impedance arms at least one of which is variable with changes in a condition; terminals for connection with a source of alternating current; and means connected with the said impedance device, the terminals, and the deflecting coil for energizing the latter with an alternating current having a D. C. component the magnitude of which is controlled by the relative values of the said impedance arms, the said means maintaining a pure alternating current devoid of D. C. components in the impedance device.

15. The invention as defined in claim 10, in which a resistor is series-connected to the rectifier shunted across the restoring coil, and in which the said circuit has an impedance equal to that of said circuit means, thereby to maintain pure A. C. in the impedance device.

16. The invention as defined in claim 10 in which there are means to vary the current in the restoring coil while maintaining the current in the deflecting coil substantially unchanged.

17. The invention as defined in claim 10, in which there are two resistors, one in series with each of the rectifiers connected to the one terminal to which the deflecting coil is connected, said resistors and deflecting coil being of equal resistance.

18. An indicator arranged for energization from a source of alternating current and including an adjustable impedance means having a pair of impedance arms variable inversely with respect to each other, a meter having an operating coil, a first circuit including a first rectifier connecting said coil and one of said arms in series with each other and with said first rectifier for constraining current to flow in one direction through said coil and said one arm, a second circuit including a second rectifier connecting said coil and the other of said arms in series with each other and with said second rectifier for constraining current to flow in the other direction through said coil and said other arm, a first by-pass circuit including rectifying means and connected around said coil and in series with said one of said arms for constraining current to flow in said other direction through the by-pass circuit and into and through said one arm, and a second by-pass circuit including rectifying means and connected around said coil and in series with said other of said arms for constraining current to flow through said second by-pass circuit in said one direction and into and through said other arm, said first and second rectifiers being of substantially the same impedance, and the impedance of each of said by-pass circuits being substantially equal to each other and to the combined impedance of said coil and one of said rectifiers whereby the successive half waves of alternating current flowing in said impedance arms are substantially equal to each other.

KNUD J. KNUDSEN.

REFERENCES CITED

The following references are of record in the file of this patent:

UNITED STATES PATENTS

| Number | Name | Date |
|---|---|---|
| 1,587,050 | Tanner | June 1, 1926 |
| 1,985,095 | Hoare | Dec. 18, 1934 |
| 2,003,929 | Fischel et al. | June 4, 1935 |
| 2,232,288 | Uehling | Feb. 18, 1941 |